US011736341B2

(12) United States Patent
Dutta et al.

(10) Patent No.: US 11,736,341 B2
(45) Date of Patent: Aug. 22, 2023

(54) BEAM FAILURE INDICATIONS BETWEEN SIDELINK USER EQUIPMENTS

(71) Applicant: QUALCOMM Incorporated, San Diego, CA (US)

(72) Inventors: Sourjya Dutta, San Diego, CA (US); Kapil Gulati, Belle Mead, NJ (US); Gabi Sarkis, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 17/169,133

(22) Filed: Feb. 5, 2021

(65) Prior Publication Data

US 2022/0255793 A1 Aug. 11, 2022

(51) Int. Cl.
*H04L 41/0668* (2022.01)
*H04W 76/18* (2018.01)
*H04L 1/00* (2006.01)
*H04W 28/18* (2009.01)
*H04W 28/02* (2009.01)
*H04W 16/28* (2009.01)
*H04W 92/18* (2009.01)

(52) U.S. Cl.
CPC ........ *H04L 41/0668* (2013.01); *H04L 1/0003* (2013.01); *H04L 1/0009* (2013.01); *H04W 16/28* (2013.01); *H04W 28/0268* (2013.01); *H04W 28/18* (2013.01); *H04W 76/18* (2018.02); *H04W 92/18* (2013.01)

(58) Field of Classification Search
CPC . H04L 41/0668; H04L 1/0009; H04L 1/0003; H04W 76/18; H04W 16/28; H04W 28/0268; H04W 28/18; H04W 92/18
See application file for complete search history.

(56) References Cited

U.S. PATENT DOCUMENTS

| 2019/0182884 | A1* | 6/2019 | Deenoo | H04W 16/28 |
|---|---|---|---|---|
| 2020/0053524 | A1* | 2/2020 | Novlan | H04W 84/20 |
| 2020/0220609 | A1* | 7/2020 | Venugopal | H04W 48/12 |
| 2020/0245395 | A1* | 7/2020 | Zhang | H04L 5/0053 |
| 2020/0252990 | A1* | 8/2020 | Ganesan | H04W 76/14 |
| 2020/0322032 | A1* | 10/2020 | Xiang | H04L 5/0048 |
| 2021/0091900 | A1* | 3/2021 | Zhang | H04W 72/0453 |
| 2021/0329724 | A1* | 10/2021 | Deenoo | H04L 1/0061 |
| 2022/0271822 | A1* | 8/2022 | Jiao | H04W 64/006 |
| 2022/0278734 | A1* | 9/2022 | Xiang | H04B 7/063 |
| 2022/0399927 | A1* | 12/2022 | Tsai | H04B 7/0617 |
| 2023/0015327 | A1* | 1/2023 | Ding | H04B 7/0608 |

FOREIGN PATENT DOCUMENTS

WO WO-2022018688 A1 * 1/2022

* cited by examiner

*Primary Examiner* — Ajay Cattungal
(74) *Attorney, Agent, or Firm* — Harrity & Harrity LLP/Qualcomm Incorporated

(57) ABSTRACT

Various aspects of the present disclosure generally relate to wireless communication. In some aspects, a first sidelink user equipment (UE) may detect a second frequency range (FR2) radio link or beam failure between the first sidelink UE and a second sidelink UE. The first sidelink UE may transmit, to the second sidelink UE, an indication of the FR2 radio link or beam failure based at least in part on a first frequency range (FR1) radio resource control (RRC) connection between the first sidelink UE and the second sidelink UE.

30 Claims, 7 Drawing Sheets

BEAM FAILURE INDICATIONS BETWEEN SIDELINK USER EQUIPMENTS

FIELD OF THE DISCLOSURE

Aspects of the present disclosure generally relate to wireless communication and to techniques and apparatuses for beam failure indications between sidelink user equipments (UEs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of UEs. A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a first sidelink UE for wireless communication includes a memory and one or more processors operatively coupled to the memory, the memory and the one or more processors configured to: detect a second frequency range (FR2) radio link or beam failure between the first sidelink UE and a second sidelink UE; and transmit, to the second sidelink UE, an indication of the FR2 radio link or beam failure based at least in part on a first frequency range (FR1) radio resource control (RRC) connection between the first sidelink UE and the second sidelink UE.

In some aspects, a method of wireless communication performed by a first sidelink UE includes detecting an FR2 radio link or beam failure between the first sidelink UE and a second sidelink UE; and transmitting, to the second sidelink UE, an indication of the FR2 radio link or beam failure based at least in part on an FR1 RRC connection between the first sidelink UE and the second sidelink UE.

In some aspects, a non-transitory computer-readable medium storing a set of instructions for wireless communication includes one or more instructions that, when executed by one or more processors of a first sidelink UE, cause the first sidelink UE to: detect an FR2 radio link or beam failure between the first sidelink UE and a second sidelink UE; and transmit, to the second sidelink UE, an indication of the FR2 radio link or beam failure based at least in part on an FR1 RRC connection between the first sidelink UE and the second sidelink UE.

In some aspects, a first apparatus for wireless communication includes means for detecting an FR2 radio link or beam failure between the first apparatus and a second apparatus; and means for transmitting, to the second apparatus, an indication of the FR2 radio link or beam failure based at least in part on an FR1 RRC connection between the first apparatus and the second apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
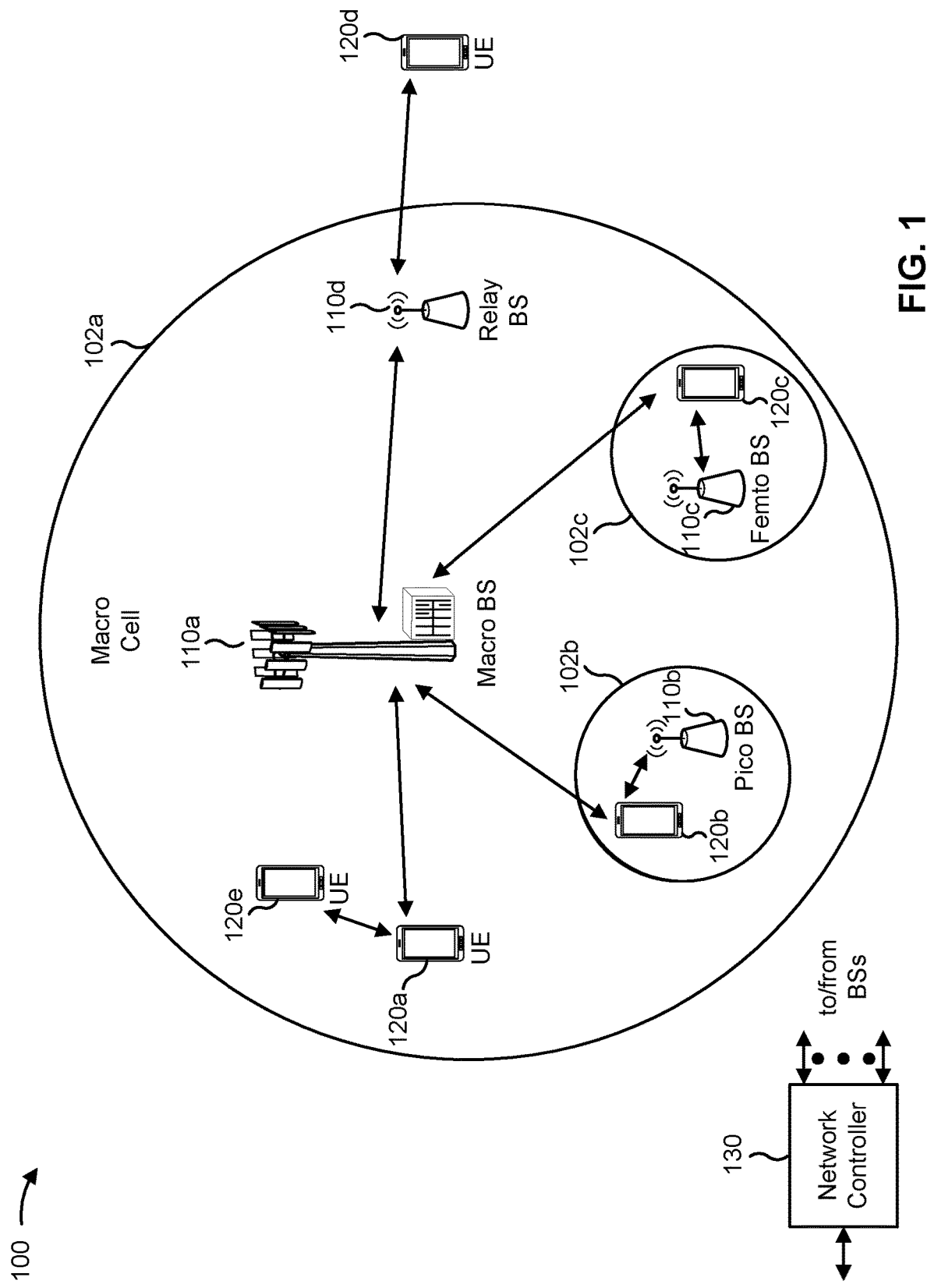
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having an FR1, which may span from 410 MHz to 7.125 GHz, and/or may communicate using an operating band having an FR2, which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
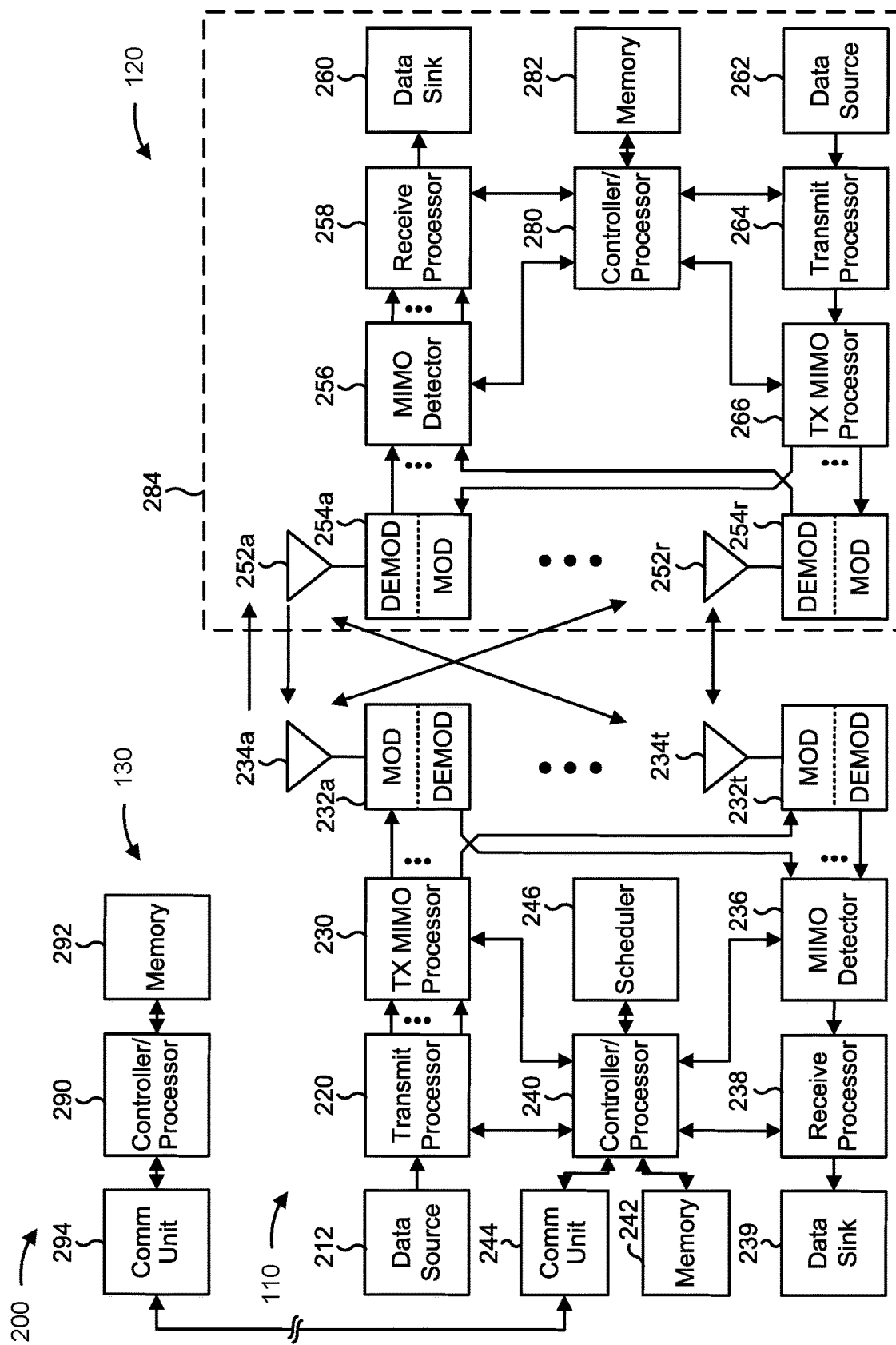
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-6.

Controller/processor 240 of base station 110, controller/processor 280 of UE 120, and/or any other component(s) of FIG. 2 may perform one or more techniques associated with beam failure indications between sidelink UEs, as described in more detail elsewhere herein. For example, controller/processor 240 of base station 110, controller/processor 280 of UE 120, and/or any other component(s) of FIG. 2 may perform or direct operations of, for example, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, and/or other processes as described herein. In some aspects, executing instructions may include running the instructions, converting the instructions, compiling the instructions, and/or interpreting the instructions, among other examples.

In some aspects, a first sidelink UE (e.g., UE 120a) includes means for detecting an FR2 radio link or beam failure between the first sidelink UE and a second sidelink UE (e.g., UE 120e); and/or means for transmitting, to the second sidelink UE, an indication of the FR2 radio link or beam failure based at least in part on an FR1 RRC connection between the first sidelink UE and the second sidelink UE. The means for the first sidelink UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first sidelink UE includes means for transmitting, to the second sidelink UE, a message to establish the FR1 RRC connection between the first sidelink UE and the second sidelink UE, wherein the message indicates that the FR1 RRC connection is for monitoring the FR2 radio link between the first sidelink UE and the second sidelink UE.

In some aspects, the first sidelink UE includes means for receiving, from the second sidelink UE via the FR1 RRC connection, a request for traffic information, wherein the request is associated with a total number of packets transmitted in a time window; and/or means for transmitting, to the second sidelink UE via the FR1 RRC connection, the traffic information based at least in part on the request.

In some aspects, the first sidelink UE includes means for transmitting, to the second sidelink UE via the FR1 RRC connection, traffic information based at least in part on a defined periodicity, wherein the traffic information indicates a total number of transmissions over a period of time.

In some aspects, the first sidelink UE includes means for transmitting, to the second sidelink UE via the FR1 RRC connection, an indication to modify an MCS (e.g., by changing a beta offset) associated with sidelink control information part 2 (SCI-2); and/or means for transmitting, to the second sidelink UE, an indication of a suggested MCS to be associated with the SCI-2.

In some aspects, the first sidelink UE includes means for receiving, from the second sidelink UE via the FR1 RRC connection, a response indicating that the MCS has been modified based at least in part on the indication received from the first sidelink UE; and/or means for receiving, from the second sidelink UE, a response indicating that the MCS has not been modified.

In some aspects, the first sidelink UE includes means for performing a beam search to mitigate the FR2 radio link or beam failure in a beam training opportunity, wherein the beam training opportunity corresponds to a semi-static network wide resource for beam training.

In some aspects, the first sidelink UE includes means for negotiating, with the second sidelink UE, one or more parameters over the FR1 RRC connection used for monitoring an FR2 radio link between the first sidelink UE and the second sidelink UE, wherein the one or more parameters correspond to one or more of: resources to be used for a beam search, beam training sequences to be used during the beam search, or random access channel (RACH) sequences or beam training response preamble sequences to be used when RACH transmissions or beam training responses occur during beam training.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
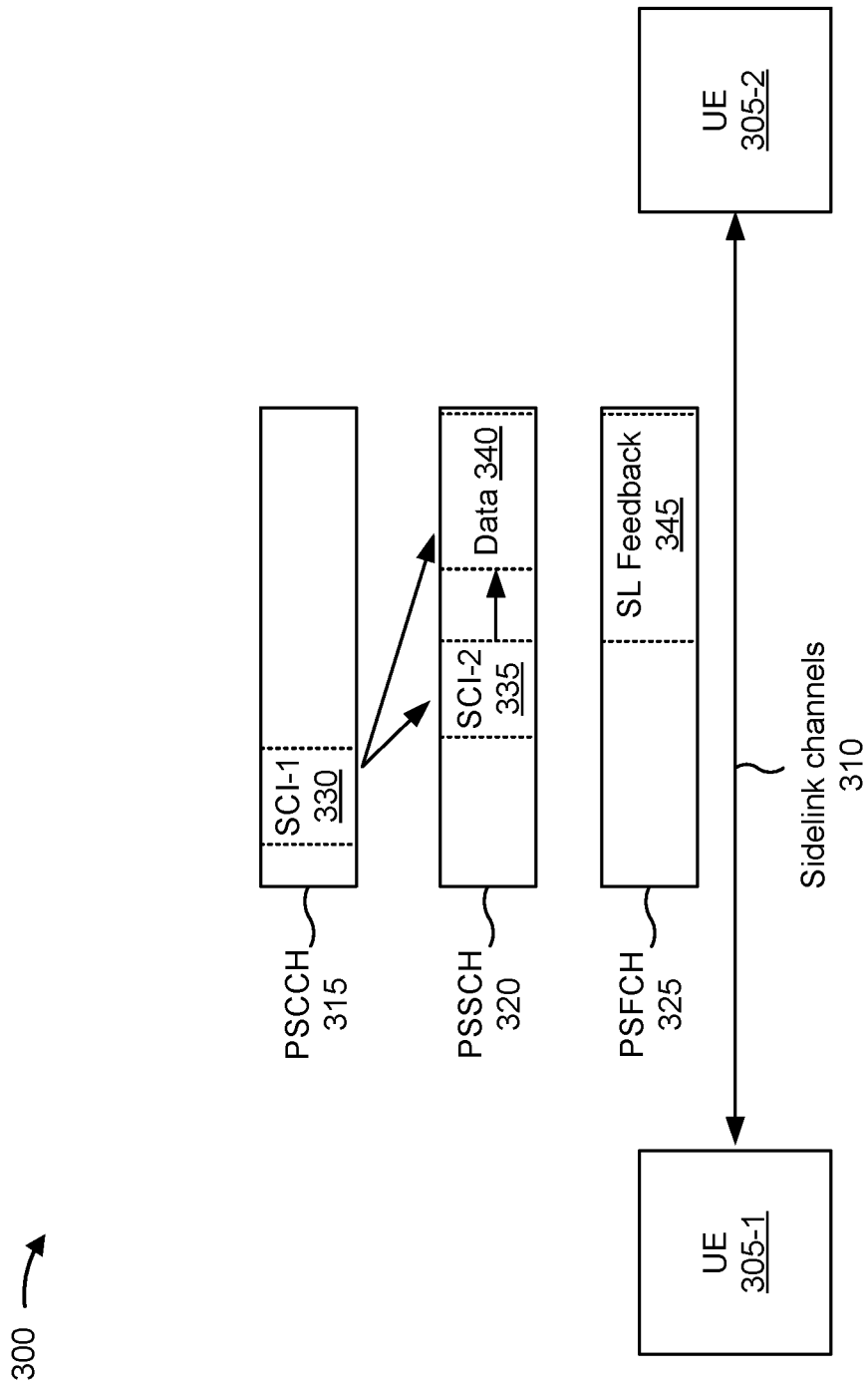
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle-to-person (V2P) communications, and/or the like), mesh networking, and/or the like. In some aspects, the UEs 305 (e.g., UE 305-1 and/or UE 305-2) may include one or more other UEs described elsewhere herein, such as UE 120. In some aspects, the one or more sidelink channels 310 may use a PC5 interface, may operate in a high frequency band (e.g., the 5.9 GHz band), may operate on an unlicensed or shared frequency band (e.g., an NR unlicensed (NR-U) frequency band), and/or the like. Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel.

The PSCCH 315 may carry sidelink control information part 1 (SCI-1) 330, which may indicate various control information used for sidelink communications. The control information may include an indication of one or more resources (e.g., time resources, frequency resources, spatial resources, and/or the like) where various types of information may be carried on the PSSCH 320, information for decoding sidelink communications on the PSSCH 320, a quality of service (QoS) priority value, a resource reservation period, a PSSCH demodulation reference signal (DMRS) pattern, a an SCI format and a beta offset for SCI-2 335 transmitted on the PSSCH 320, a quantity of PSSCH DMRS ports, a modulation coding scheme (MCS), and/or the like.

The information carried on the PSSCH 320 may include the SCI-2 335 and/or data 340. The SCI-2 335 may include various types of information, such as a hybrid automatic repeat request (HARM) process ID, a new data indicator (NDI) associated with the data 340, a source identifier, a destination identifier, a channel state information (CSI) report trigger, and/or the like. In some aspects, a UE 305 may transmit both the SCI-1 330 and the SCI-2 335. In some aspects, a UE 305 may transmit only SCI-1 330, in which case one or more types of the information that would otherwise be transmitted in the SCI-2 335 may be transmitted in the SCI-1 330 instead.

The PSFCH 325 may be used to communicate sidelink feedback 345, such as HARQ feedback (e.g., acknowledgement or negative acknowledgement (ACK/NACK) information), transmit power control (TPC), a scheduling request (SR), and/or the like.

As indicated above, FIG. 3 is provided as an example. Other examples may differ from what is described with respect to FIG. 3.

Figure 4:
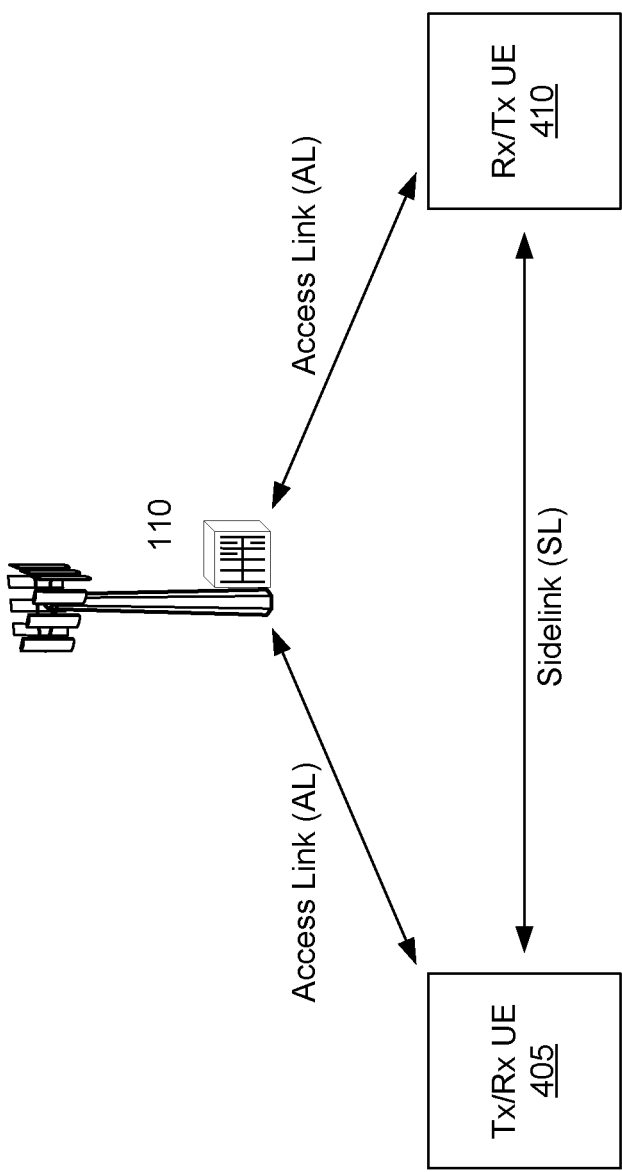
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

For sidelink communications over FR2, FR2 links may use beamforming to allow sidelink communications over a given range, due to relatively high pathloss. Beam search and periodic beam training may be used to maintain the FR2 links. Sidelink communications allow for device-to-device communication, with or without assistance from a base station. Further, sidelink networks may be distributed, such that each device may maintain communication links with multiple peer devices. For example, a UE may maintain sidelink communication links with multiple other UEs.

Sidelink communication over FR2, or a millimeter (mm-Wave) band, may be different than communication for cellular applications. For example, in cellular, a UE may maintain a link with one base station (e.g., a Uu interface), or one access point in a WiFi scenario. In sidelink, UEs may create and monitor multiple beam pair links with other UEs.

For distributed sidelink communication over FR2, network-wide periodic resources may be semi-statically configured for beam search and training. These resources may span over a relatively long period, as multiple UEs may create/maintain links with one another. These resources may occur with longer periods to reduce overhead. For example, a 100 ms beam training window may be configured every 1000 ms, thereby resulting in 10% overhead. Beam search and training may be performed in between network-wide resources to enhance link throughput and reliability.

Radio link monitoring (RLM) and beam/link failure detection mechanisms, such radio link failure (RLF) detection, may be applicable to sidelink communications over FR2. A beam/link failure may be a link condition at which control decoding fails with a probability that satisfies a threshold. In sidelink, two peer UEs may need to determine and mitigate the link/beam failure without periodic reference signals from the base station.

For FR2 cellular (Uu interface) applications, RLM may be performed based at least in part on periodic reference signals. A UE may use a periodic channel state information reference signal (CSI-RS), or a PSS or an SSS, to determine a hypothetical block error rate (BLER) for a control channel. Other UEs may receive an indication that the CSI-RS or the SSS are scheduled at a fixed periodicity. When a PDCCH hypothetical BLER does not satisfy a threshold (e.g., a PDCCH hypothetical BLER falls below a threshold), UEs may trigger a link failure mitigation procedure.

Sidelink networks may be distributed in nature, such that each UE may have multiple connections with multiple UEs. Sidelink networks may not have a provision for periodic reference signals or synchronization signals between two UEs. Further, a base station may transmit synchronization signals, so a UE determining link failure may listen on these synchronization resources for link reestablishment. Sidelink UEs may not transmit beam training signals on every beam training occasion, so to mitigate a beam failure event, both UEs may need to identify that a beam/link failure has occurred. However, during the beam failure event, one UE may not be able to send a failure indication to peer UEs over FR2.

Some sidelink UEs may have a non-standalone FR2 capability. For example, sidelink UEs operating over FR2 may have support for FR1 communication, such as NR on 5.9 GHz channels or LTE on 2.4 GHz channels. A presence of more stable but low spectral resource links may simplify an FR2 design for sidelink.

Sidelink UEs operating over FR2 may support FR1 communications but may not be configured to perform signaling over FR1 during an FR2 radio link/beam failure mitigation. In other words, sidelink UEs may be subjected to an FR2 radio link/beam failure that prevents sidelink communications from occurring over FR2, but the sidelink UEs may be able to communicate with each other over FR1, even though FR1 links may be associated with low spectral resources. However, the sidelink UEs are not configured to utilize FR1 to communicate information regarding the FR2 radio link/beam failure.

In various aspects of techniques and apparatuses described herein, a first sidelink UE may detect an FR2 radio link/beam failure between the first sidelink UE and a second sidelink UE. The first sidelink UE and the second sidelink UE may be associated with a non-standalone FR2 capability. The first sidelink UE may transmit, to the second sidelink UE, an indication of the FR2 radio link/beam failure based at least in part on an FR1 RRC connection between the first sidelink UE and the second sidelink UE. For example, the first sidelink UE may transmit an RRC reconfiguration message that indicates the FR2 radio link/beam failure based at least in part on the FR1 RRC connection between the first sidelink UE and the second sidelink UE. Further, the first sidelink UE may communicate with the second sidelink UE via the FR1 RRC connection to perform FR2 radio link/beam failure mitigation. For example, the first sidelink UE may negotiate various parameters for performing a beam search, which may be performed by the first and second sidelink UEs to resolve the FR2 radio link/beam failure. As a result, the first and second sidelink UEs may utilize the FR1 RRC connection for indicating FR2 radio link/beam failure and for beam failure recovery.

Figure 5:
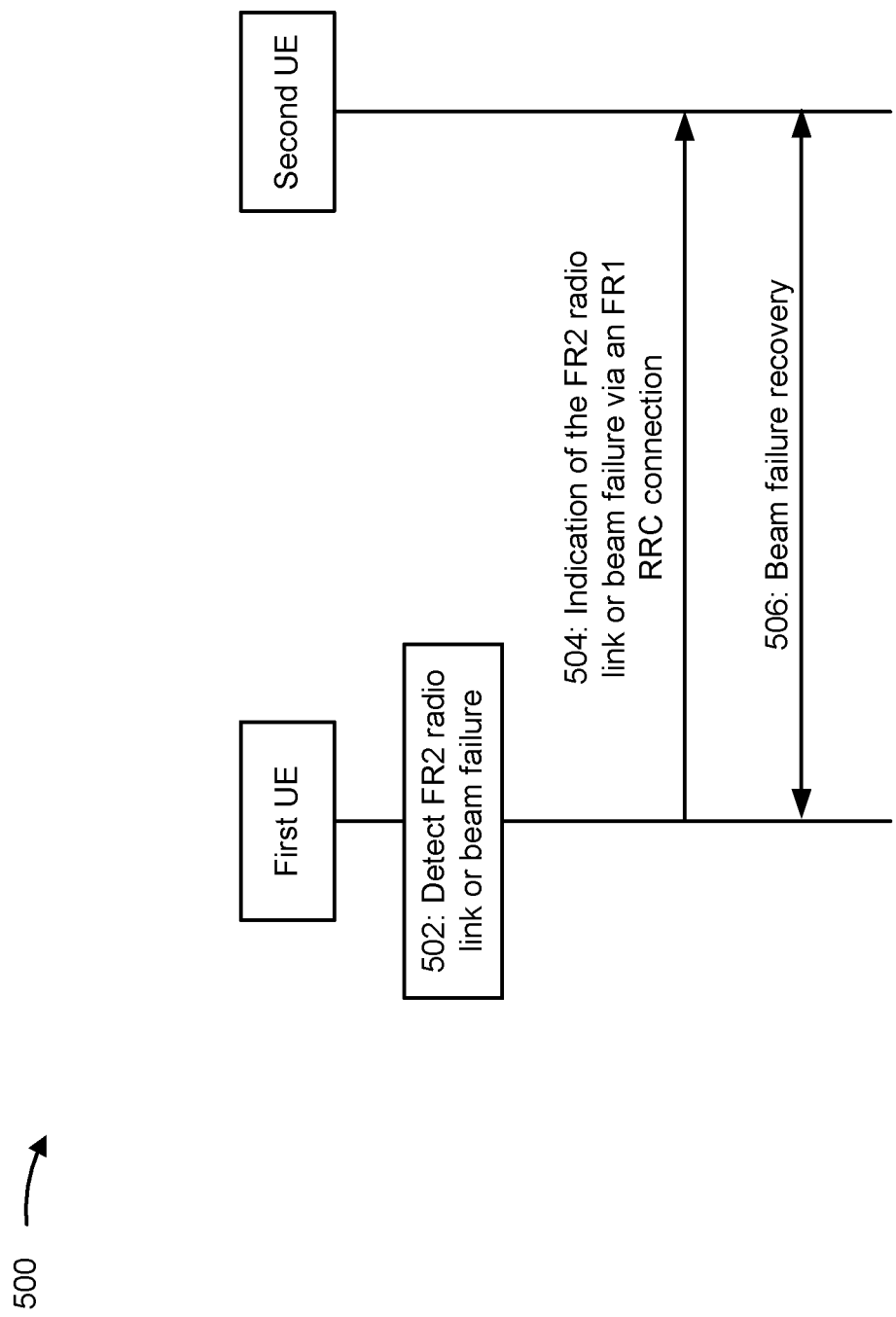
FIG. 5 is a diagram illustrating an example associated with beam failure indications between sidelink UEs, in accordance with the present disclosure.

FIG. 5 is a diagram illustrating an example 500 of beam failure indications between sidelink UEs, in accordance with the present disclosure. As shown in FIG. 5, example 500 includes communication between a first sidelink UE (e.g., UE 120*a*) and a second sidelink UE (e.g., UE 120*e*). In some aspects, the first sidelink UE and the second sidelink UE may be included in a wireless network such as wireless network 100. In some aspects, the first sidelink UE and the second sidelink UE may communicate over a sidelink.

As shown by reference number 502, the first sidelink UE may detect an FR2 radio link/beam failure between the first sidelink UE and a second sidelink UE. In some aspects, the first sidelink UE may detect the FR2 radio link/beam failure based at least in part on a BLER. The BLER may be based at least in part on a packet count and/or traffic information associated with sidelink communications between the first sidelink UE and the second sidelink UE.

As shown by reference number 504, the first sidelink UE may transmit, to the second sidelink UE, an indication of the FR2 radio link/beam failure based at least in part on an FR1 RRC connection between the first sidelink UE and the second sidelink UE. FR1 may correspond to a sub-6 gigahertz band and FR2 may correspond to a millimeter wave band.

In some aspects, the first sidelink UE and the second sidelink UE may be sidelink UEs with a non-standalone FR2 capability. In other words, the first and second UEs may not support a standalone FR2 capability and may also have an FR1 capability.

In some aspects, the indication may be transmitted in an RRC reconfiguration message. For example, the first sidelink UE may transmit the RRC reconfiguration message that indicates the FR2 radio link/beam failure. The first sidelink UE may transmit the RRC reconfiguration message based at least in part on an FR1 RRC connection between the first sidelink UE and the second sidelink UE.

In some aspects, the first sidelink UE may transmit, to the second sidelink UE, a message to establish the FR1 RRC connection between the first sidelink UE and the second sidelink UE. The message may indicate that the FR1 RRC connection is for monitoring the FR2 radio link between the first sidelink UE and the second sidelink UE.

In some aspects, either sidelink UE between the first sidelink UE and the second sidelink UE may detect a FR2 link/beam failure and transmit an indication of the FR2 link/beam failure. A sidelink UE that detects the FR2 link/beam failure may use an FR1 link to indicate the FR2 link/beam failure. In some aspects, an FR1 RRC connection may exist between two sidelink UEs, and an RRC reconfiguration message may be transmitted via the FR1 RRC connection to indicate the FR2 link/beam failure to the other sidelink UE. In some aspects, an FR1 RRC connection may not initially exist between two sidelink UEs. In this case, the sidelink UE detecting the FR2 link/beam failure may initiate an FR1 RRC establishment with the other sidelink UE. The FR1 RRC establishment may include an indication that the FR1 RRC establishment is for monitoring the FR2 link. After the FR1 RRC connection is established, a message may be transmitted via the FR1 RRC connection to indicate the FR2 link/beam failure to the other sidelink UE.

In some aspects, the first sidelink UE may receive, from the second sidelink UE via the FR1 RRC connection, a request for traffic information. The request may be associated with a total number of packets transmitted in a time window. The first sidelink UE may transmit, to the second sidelink UE via the FR1 RRC connection, the traffic information based at least in part on the request. In some aspects, the first sidelink UE may transmit, to the second sidelink UE via the FR1 RRC connection, traffic information based at least in part on a defined periodicity. The traffic information may indicate a total number of transmissions over a period of time. The defined periodicity may be configured as a default parameter for a plurality of traffic types. The defined periodicity may be based at least in part on quality of service (QoS) parameters associated with different traffic classes. The defined periodicity may be negotiated per link or per session between the first sidelink UE and the second sidelink UE.

In some aspects, when an RRC connection for FR2 link monitoring exists over an FR1 link, sidelink UEs may choose to share or request for traffic information (e.g., statistics) corresponding to transmitted traffic from peer UEs. The traffic information may be based at least in part on requests received over the FR1 RRC connection. For example, the first sidelink UE may send a request to the second sidelink UE to provide a total number of transmitted packets for a given time window. In some aspects, sidelink UEs may exchange traffic information periodically with other sidelink UEs. For example, the first sidelink UE may report, to the second sidelink UE, a total number of transmissions made every second or every 500 ms, etc. A periodicity associated with exchanging the traffic information may be configured as a default parameter for a plurality of traffic types (e.g., all traffic types). The periodicity may be based at least in part on QoS requirements for different traffic classes. The periodicity may be negotiated between the sidelink UEs per link or per session. In some aspects, the traffic information (e.g., a packet count) may be used by the sidelink UEs to compute or refine a BLER determination, which may be used to detect the FR2 link/beam failure.

As shown by reference number 506, the first sidelink UE may perform a beam failure recovery with the second sidelink UE based at least in part on the FR2 radio link/beam failure detection between the first sidelink UE and a second sidelink UE. The beam failure recovery may serve to resolve the FR2 radio link/beam failure between the first sidelink UE and the second sidelink UE.

In some aspects, the first sidelink UE may detect the FR2 radio link/beam failure based at least in part on an SCI-2 decoding failure at the first sidelink UE. During an FR2 radio link/beam failure recovery, the first sidelink UE may transmit, to the second sidelink UE, an indication to modify an MCS associated with the SCI-2. Alternatively, the first sidelink UE may transmit, to the second sidelink UE, an indication of a suggested MCS (e.g., indicated by the beta offset) to be associated with the SCI-2. The first sidelink UE may receive, from the second sidelink UE, a response indicating that the MCS has been modified based at least in part on the indication received from the first sidelink UE. Alternatively, the first sidelink UE may receive, from the second sidelink UE, a response indicating that the MCS has not been modified.

In some aspects, the first sidelink UE may send a request to the second sidelink UE to improve a robustness associated with the SCI-2, based at least in part on a determination by the first sidelink UE that transmissions from the second sidelink UE are failing due to SCI-2 decoding failures. In some aspects, the first sidelink UE may use the FR1 RRC connection with the second sidelink UE to indicate, to the second sidelink UE, that a change in the MCS for the SCI-2 may be needed to improve the SCI-2 robustness. In some aspects, the first sidelink UE may use the FR1 RRC connection with the second sidelink UE to indicate, to the second sidelink UE, a suggested change to the MCS to improve the SCI-2 robustness. In some aspects, the second sidelink UE may accept the request and modify the MCS associated with the SCI-2, or the second sidelink UE may send an indication to the first sidelink UE that the MCS cannot be modified to improve the SCI-2 robustness.

In some aspects, the first sidelink UE may perform a beam search to mitigate the FR2 radio link/beam failure in a beam training opportunity. The beam training opportunity may correspond to a semi-static network wide resource for beam training. In some aspects, the first sidelink UE may negotiate, with the second sidelink UE, one or more parameters over the FR1 RRC connection used for monitoring an FR2 radio link between the first sidelink UE and the second sidelink UE. The one or more parameters may correspond to resources to be used for a beam search, beam training sequences to be used during the beam search, and/or RACH sequences to be used when RACH transmissions occur during beam training.

In some aspects, an exhaustive beam search may be performed to mitigate the FR2 radio link/beam failure. For example, sidelink UEs may perform the exhaustive beam search in a later beam training opportunity. These opportunities for beam training may correspond to semi-static network wide resources for beam training. The sidelink UEs may negotiate various parameters with each other over the FR1 link used for the FR2 monitoring. The sidelink UEs may negotiate time and frequency resources to be used for the exhaustive beam search. The sidelink UEs may negotiate or indicate beam training sequence(s) that may be used during exhaustive beam search. The sidelink UEs may negotiate whether beam training is associated with RACH transmissions or is to use beam training responses. When RACH transmissions or beam training responses are part of the beam training, the sidelink UEs may negotiate RACH sequences or beam training response preamble sequences to be used for the RACH transmissions or the beam training responses.

As indicated above, FIG. 5 is provided as an example. Other examples may differ from what is described with respect to FIG. 5.

Figure 6:
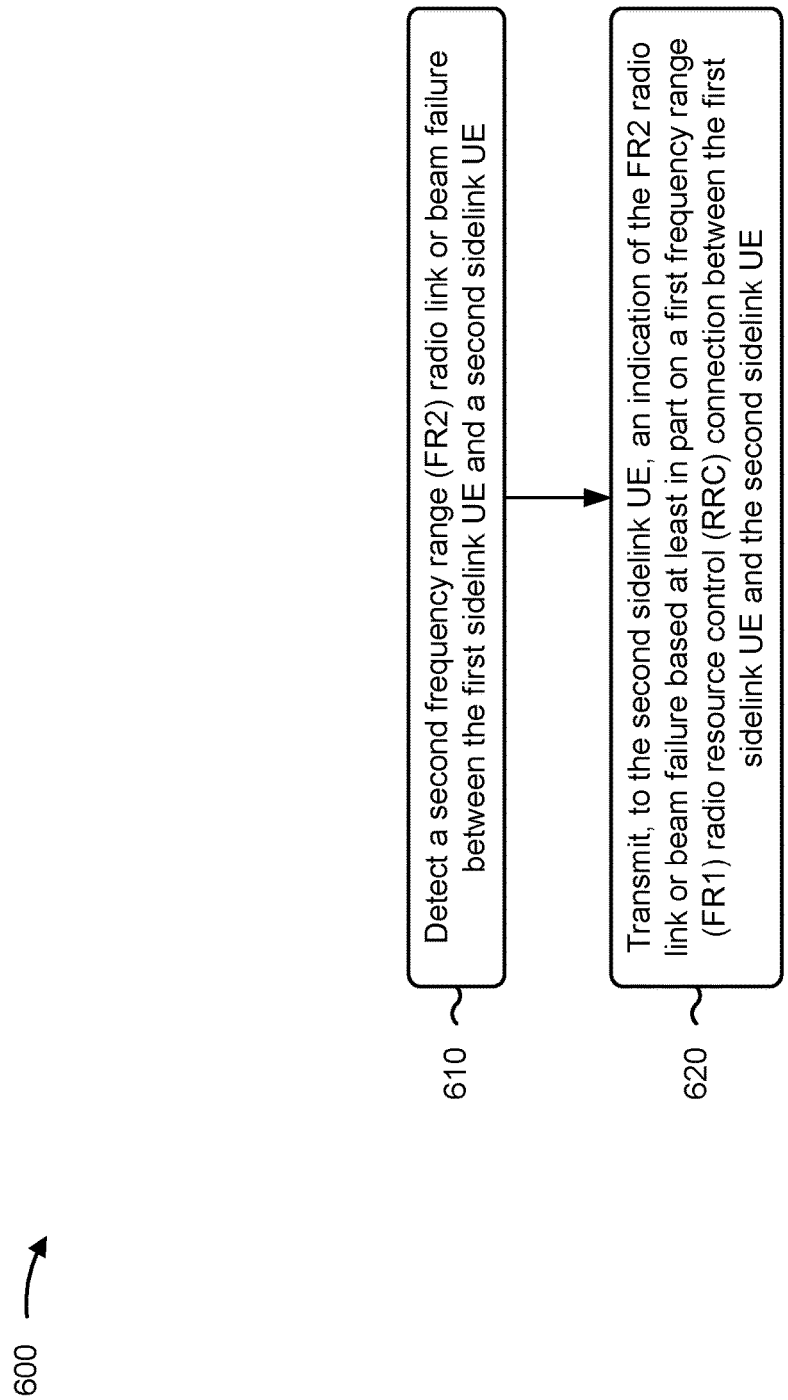
FIG. 6 is a diagram illustrating an example process associated with beam failure indications between sidelink UEs, in accordance with the present disclosure.

FIG. 6 is a diagram illustrating an example process 600 performed, for example, by a first sidelink UE, in accordance with the present disclosure. Example process 600 is an example where the UE (e.g., UE 120) performs operations associated with beam failure indications between sidelink UEs.

As shown in FIG. 6, in some aspects, process 600 may include detecting an FR2 radio link or beam failure between the first sidelink UE and a second sidelink UE (block 610). For example, the UE (e.g., using detection component 708, depicted in FIG. 7) may detect an FR2 radio link or beam failure between the first sidelink UE and a second sidelink UE, as described above.

As further shown in FIG. 6, in some aspects, process 600 may include transmitting, to the second sidelink UE, an indication of the FR2 radio link or beam failure based at least in part on an FR1 RRC connection between the first sidelink UE and the second sidelink UE (block 620). For example, the UE (e.g., using transmission component 704, depicted in FIG. 7) may transmit, to the second sidelink UE, an indication of the FR2 radio link or beam failure based at least in part on an FR1 RRC connection between the first sidelink UE and the second sidelink UE, as described above.

Process 600 may include additional aspects, such as any single aspect or any combination of aspects described below and/or in connection with one or more other processes described elsewhere herein.

In a first aspect, transmitting the indication comprises transmitting an RRC reconfiguration message that indicates the FR2 radio link or beam failure based at least in part on the FR1 RRC connection between the first sidelink UE and the second sidelink UE.

In a second aspect, alone or in combination with the first aspect, process 600 includes transmitting, to the second sidelink UE, a message to establish the FR1 RRC connection between the first sidelink UE and the second sidelink UE, and the message indicates that the FR1 RRC connection is for monitoring the FR2 radio link between the first sidelink UE and the second sidelink UE.

In a third aspect, alone or in combination with one or more of the first and second aspects, process 600 includes receiving, from the second sidelink UE via the FR1 RRC connection, a request for traffic information, and the request is associated with a total number of packets transmitted in a time window, and transmitting, to the second sidelink UE via the FR1 RRC connection, the traffic information based at least in part on the request.

In a fourth aspect, alone or in combination with one or more of the first through third aspects, process 600 includes transmitting, to the second sidelink UE via the FR1 RRC connection, traffic information based at least in part on a defined periodicity, and the traffic information indicates a total number of transmissions over a period of time.

In a fifth aspect, alone or in combination with one or more of the first through fourth aspects, the defined periodicity is configured as a default parameter for a plurality of traffic types.

In a sixth aspect, alone or in combination with one or more of the first through fifth aspects, the defined periodicity is based at least in part on quality of service parameters associated with different traffic classes.

In a seventh aspect, alone or in combination with one or more of the first through sixth aspects, the defined periodicity is negotiated per link or per session between the first sidelink UE and the second sidelink UE.

In an eighth aspect, alone or in combination with one or more of the first through seventh aspects, detecting the FR2 radio link or beam failure comprises detecting the FR2 radio link or beam failure based at least in part on a block error rate derived from a packet count or traffic information associated with sidelink communications between the first sidelink UE and the second sidelink UE.

In a ninth aspect, alone or in combination with one or more of the first through eighth aspects, detecting the FR2 radio link or beam failure comprises detecting the FR2 radio link or beam failure based at least in part on an SCI-2 decoding failure at the first sidelink UE.

In a tenth aspect, alone or in combination with one or more of the first through ninth aspects, process 600 includes transmitting, to the second sidelink UE via the FR1 RRC connection, an indication to modify an MCS associated with the SCI-2, or transmitting, to the second sidelink UE, an indication of a suggested MCS to be associated with the SCI-2.

In an eleventh aspect, alone or in combination with one or more of the first through tenth aspects, process 600 includes receiving, from the second sidelink UE via the FR1 RRC connection, a response indicating that the MCS has been modified based at least in part on the indication received from the first sidelink UE, or receiving, from the second sidelink UE, a response indicating that the MCS has not been modified.

In a twelfth aspect, alone or in combination with one or more of the first through eleventh aspects, process 600 includes performing a beam search to mitigate the FR2 radio link or beam failure in a beam training opportunity, and the beam training opportunity corresponds to a semi-static network wide resource for beam training.

In a thirteenth aspect, alone or in combination with one or more of the first through twelfth aspects, process 600 includes negotiating, with the second sidelink UE, one or more parameters over the FR1 RRC connection used for monitoring an FR2 radio link between the first sidelink UE and the second sidelink UE, wherein the one or more parameters correspond to one or more of resources to be used for a beam search, beam training sequences to be used during the beam search, or RACH sequences to be used when RACH transmissions occur during beam training.

In a fourteenth aspect, alone or in combination with one or more of the first through thirteenth aspects, the first sidelink UE and the second sidelink UE are sidelink UEs with a non-standalone FR2 capability.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
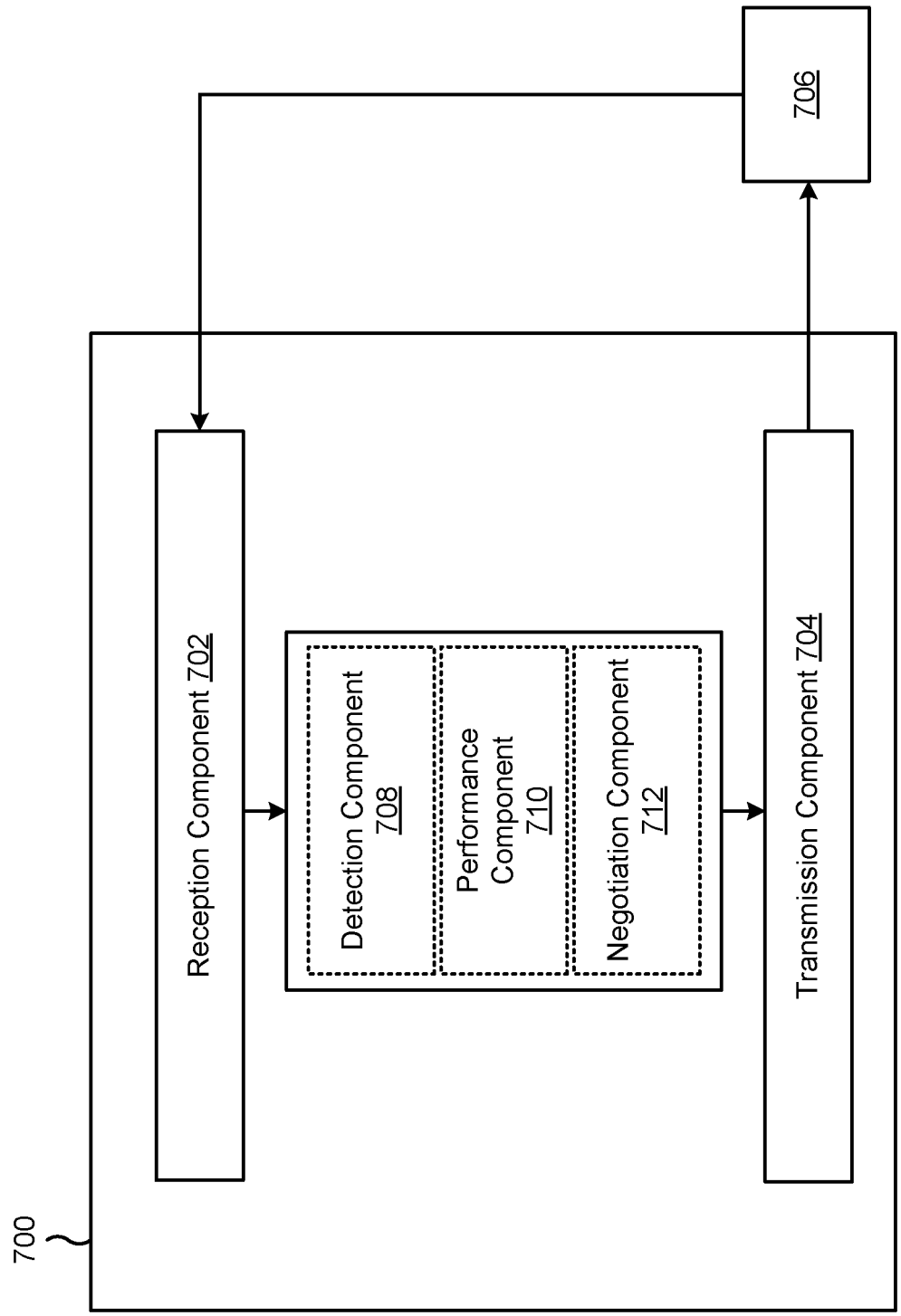
FIG. 7 is a block diagram of an example apparatus for wireless communication, in accordance with the present disclosure.

FIG. 7 is a block diagram of an example apparatus 700 for wireless communication. The apparatus 700 may be a first sidelink UE, or a first sidelink UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a detection component 708, a performance component 710, or a negotiation component 712, among other examples.

In some aspects, the apparatus 700 may be configured to perform one or more operations described herein in connection with FIG. 5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the first sidelink UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the first sidelink UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the first sidelink UE described above in connection with FIG. 2. In some aspects, the transmission component 704 may be co-located with the reception component 702 in a transceiver.

The detection component 708 may detect an FR2 radio link or beam failure between the first sidelink UE and a second sidelink UE. The transmission component 704 may transmit, to the second sidelink UE, an indication of the FR2 radio link or beam failure based at least in part on an FR1 RRC connection between the first sidelink UE and the second sidelink UE.

The transmission component 704 may transmit, to the second sidelink UE, a message to establish the FR1 RRC connection between the first sidelink UE and the second sidelink UE, wherein the message indicates that the FR1 RRC connection is for monitoring the FR2 radio link between the first sidelink UE and the second sidelink UE.

The reception component 702 may receive, from the second sidelink UE via the FR1 RRC connection, a request for traffic information, wherein the request is associated with a total number of packets transmitted in a time window.

The transmission component 704 may transmit, to the second sidelink UE via the FR1 RRC connection, the traffic information based at least in part on the request. The transmission component 704 may transmit, to the second sidelink UE via the FR1 RRC connection, traffic information based at least in part on a defined periodicity, wherein the traffic information indicates a total number of transmissions over a period of time.

The transmission component 704 may transmit, to the second sidelink UE via the FR1 RRC connection, an indication to modify an MCS associated with the SCI-2. The transmission component 704 may transmit, to the second sidelink UE, an indication of a suggested MCS to be associated with the SCI-2.

The reception component 702 may receive, from the second sidelink UE via the FR1 RRC connection, a response indicating that the MCS has been modified based at least in part on the indication received from the first sidelink UE. The reception component 702 may receive, from the second sidelink UE, a response indicating that the MCS has not been modified.

The performance component 710 may perform a beam search to mitigate the FR2 radio link or beam failure in a beam training opportunity, and the beam training opportunity corresponds to a semi-static network wide resource for beam training.

The negotiation component 712 may negotiate, with the second sidelink UE, one or more parameters over the FR1 RRC connection used for monitoring an FR2 radio link between the first sidelink UE and the second sidelink UE, wherein the one or more parameters correspond to one or more of: resources to be used for a beam search, beam training sequences to be used during the beam search, or random access channel (RACH) sequences to be used when RACH transmissions occur during beam training.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some aspects of the present disclosure:

Aspect 1: A method of wireless communication performed by a first sidelink user equipment (UE), comprising: detecting a second frequency range (FR2) radio link or beam failure between the first sidelink UE and a second sidelink UE; and transmitting, to the second sidelink UE, an indication of the FR2 radio link or beam failure based at least in part on a first frequency range (FR1) radio resource control (RRC) connection between the first sidelink UE and the second sidelink UE.

Aspect 2: The method of aspect 1, wherein transmitting the indication comprises transmitting an RRC reconfiguration message that indicates the FR2 radio link or beam failure based at least in part on the FR1 RRC connection between the first sidelink UE and the second sidelink UE.

Aspect 3: The method of any of aspects 1 through 2, further comprising: transmitting, to the second sidelink UE, a message to establish the FR1 RRC connection between the first sidelink UE and the second sidelink UE, wherein the message indicates that the FR1 RRC connection is for monitoring the FR2 radio link between the first sidelink UE and the second sidelink UE.

Aspect 4: The method of any of aspects 1 through 3, further comprising: receiving, from the second sidelink UE via the FR1 RRC connection, a request for traffic information, wherein the request is associated with a total number of packets transmitted in a time window; and transmitting, to the second sidelink UE via the FR1 RRC connection, the traffic information based at least in part on the request.

Aspect 5: The method of any of aspects 1 through 4, further comprising: transmitting, to the second sidelink UE via the FR1 RRC connection, traffic information based at least in part on a defined periodicity, wherein the traffic information indicates a total number of transmissions over a period of time.

Aspect 6: The method of aspect 5, wherein the defined periodicity is configured as a default parameter for a plurality of traffic types.

Aspect 7: The method of aspect 5, wherein the defined periodicity is based at least in part on quality of service parameters associated with different traffic classes.

Aspect 8: The method of aspect 5, wherein the defined periodicity is negotiated per link or per session between the first sidelink UE and the second sidelink UE.

Aspect 9: The method of any of aspects 1 through 8, wherein detecting the FR2 radio link or beam failure comprises detecting the FR2 radio link or beam failure based at least in part on a block error rate derived from a packet count or traffic information associated with sidelink communications between the first sidelink UE and the second sidelink UE.

Aspect 10: The method of any of aspects 1 through 9, wherein detecting the FR2 radio link or beam failure comprises detecting the FR2 radio link or beam failure based at least in part on a sidelink control information part 2 (SCI-2) decoding failure at the first sidelink UE.

Aspect 11: The method of aspect 10, further comprising: transmitting, to the second sidelink UE via the FR1 RRC connection, an indication to modify a modulation and coding scheme (MCS) associated with the SCI-2, wherein the MCS is based at least in part on a beta offset; or transmitting, to the second sidelink UE, an indication of a suggested MCS to be associated with the SCI-2.

Aspect 12: The method of aspect 11, further comprising: receiving, from the second sidelink UE via the FR1 RRC connection, a response indicating that the MCS has been modified based at least in part on the indication received from the first sidelink UE; or receiving, from the second sidelink UE, a response indicating that the MCS has not been modified.

Aspect 13: The method of any of aspects 1 through 12, further comprising: performing a beam search to mitigate the FR2 radio link or beam failure in a beam training opportunity, wherein the beam training opportunity corresponds to a semi-static network wide resource for beam training.

Aspect 14: The method of any of aspects 1 through 13, further comprising: negotiating, with the second sidelink UE, one or more parameters over the FR1 RRC connection used for monitoring an FR2 radio link between the first sidelink UE and the second sidelink UE, wherein the one or more parameters correspond to one or more of: resources to be used for a beam search, beam training sequences to be used during the beam search, or random access channel (RACH) sequences or beam training response preamble sequences to be used when RACH transmissions or beam training responses occur during beam training.

Aspect 15: The method of any of aspects 1 through 14, wherein the first sidelink UE and the second sidelink UE are sidelink UEs with a non-standalone FR2 capability.

Aspect 16: An apparatus for wireless communication at a device, comprising a processor; memory coupled with the processor; and instructions stored in the memory and executable by the processor to cause the apparatus to perform the method of one or more aspects of aspects 1-15.

Aspect 17: A device for wireless communication, comprising a memory and one or more processors coupled to the memory, the memory and the one or more processors configured to perform the method of one or more aspects of aspects 1-15.

Aspect 18: An apparatus for wireless communication, comprising at least one means for performing the method of one or more aspects of aspects 1-15.

Aspect 19: A non-transitory computer-readable medium storing code for wireless communication, the code comprising instructions executable by a processor to perform the method of one or more aspects of aspects 1-15.

Aspect 20: A non-transitory computer-readable medium storing a set of instructions for wireless communication, the set of instructions comprising one or more instructions that, when executed by one or more processors of a device, cause the device to perform the method of one or more aspects of aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first sidelink user equipment (UE) for wireless communication, comprising:
   a memory; and
   one or more processors coupled to the memory, the one or more processors configured to:
      detect a second frequency range (FR2) radio link or beam failure between the first sidelink UE and a second sidelink UE; and
      transmit, to the second sidelink UE, an indication of the FR2 radio link or beam failure based at least in part on a first frequency range (FR1) radio resource control (RRC) connection between the first sidelink UE and the second sidelink UE,
      wherein at least one of:
         the FR2 radio link or beam failure is detected based at least in part on a sidelink control information part 2 (SCI-2) decoding failure at the first sidelink UE, or
      the one or more processors configured to perform at least one of:
         transmit traffic information based at least in part on a traffic information request, associated with a total quantity of packets transmitted in a time window, or a defined periodicity,
         perform a beam search to mitigate the FR2 radio link or beam failure in a beam training opportunity corresponding to a semi-static network wide resource for beam training, or
         negotiate, with the second sidelink UE and over the FR1 RRC connection, one or more parameters associated with monitoring the FR2 radio link.

2. The first sidelink UE of claim 1, wherein the one or more processors, when transmitting the indication, are configured to transmit an RRC reconfiguration message that indicates the FR2 radio link or beam failure based at least in part on the FR1 RRC connection between the first sidelink UE and the second sidelink UE.

3. The first sidelink UE of claim 1, wherein the one or more processors are further configured to:
   transmit, to the second sidelink UE, a message to establish the FR1 RRC connection between the first sidelink UE and the second sidelink UE, wherein the message indicates that the FR1 RRC connection is for monitoring the FR2 radio link between the first sidelink UE and the second sidelink UE.

4. The first sidelink UE of claim 1, wherein the one or more processors are further configured to:
   receive, from the second sidelink UE via the FR1 RRC connection, the traffic information request; and
   transmit, to the second sidelink UE via the FR1 RRC connection, the traffic information based at least in part on the traffic information request.

5. The first sidelink UE of claim 1, wherein the one or more processors are further configured to:
   transmit, to the second sidelink UE via the FR1 RRC connection, the traffic information based at least in part on the defined periodicity, wherein the traffic information indicates a total number of transmissions over a period of time.

6. The first sidelink UE of claim 5, wherein the defined periodicity is configured as a default parameter for a plurality of traffic types.

7. The first sidelink UE of claim 5, wherein the defined periodicity is based at least in part on quality of service parameters associated with different traffic classes.

8. The first sidelink UE of claim 5, wherein the defined periodicity is negotiated per link or per session between the first sidelink UE and the second sidelink UE.

9. The first sidelink UE of claim 1, wherein the one or more processors, when detecting the FR2 radio link or beam failure, are configured to detect the FR2 radio link or beam failure based at least in part on a block error rate associated with a packet count or the traffic information.

10. The first sidelink UE of claim 1, wherein the one or more processors, when detecting the FR2 radio link or beam failure, are configured to detect the FR2 radio link or beam failure based at least in part on the SCI-2 decoding failure.

11. The first sidelink UE of claim 10, wherein the one or more processors are further configured to:
   transmit, to the second sidelink UE via the FR1 RRC connection, an indication to modify a modulation and coding scheme (MCS) associated with a SCI-2, wherein the MCS is based at least in part on a beta offset; or transmit, to the second sidelink UE, an indication of a suggested MCS to be associated with the SCI-2.

12. The first sidelink UE of claim 11, wherein the one or more processors are further configured to:
receive, from the second sidelink UE via the FR1 RRC connection, a response indicating that the MCS has been modified based at least in part on the indication received from the first sidelink UE; or
receive, from the second sidelink UE, a response indicating that the MCS has not been modified.

13. The first sidelink UE of claim 1, wherein the one or more processors are further configured to:
perform the beam search.

14. The first sidelink UE of claim 1, wherein the one or more processors are further configured to:
negotiate, with the second sidelink UE and over the FR1 RRC connection, the one or more parameters associated with monitoring the FR2 radio link between the first sidelink UE and the second sidelink UE, wherein the one or more parameters correspond to one or more of: resources associated with the beam search, beam training sequences associated with the beam search, or random access channel (RACH) sequences or beam training response preamble sequences associated with RACH transmissions or beam training responses occurring during beam training.

15. The first sidelink UE of claim 1, wherein the first sidelink UE and the second sidelink UE are sidelink UEs with a non-standalone FR2 capability, and wherein FR1 corresponds to a sub-6 gigahertz band and FR2 corresponds to a millimeter wave band.

16. A method of wireless communication performed by a first sidelink user equipment (UE), comprising:
detecting a second frequency range (FR2) radio link or beam failure between the first sidelink UE and a second sidelink UE; and
transmitting, to the second sidelink UE, an indication of the FR2 radio link or beam failure based at least in part on a first frequency range (FR1) radio resource control (RRC) connection between the first sidelink UE and the second sidelink UE,
wherein at least one of:
the FR2 radio link or beam failure is detected based at least in part on a sidelink control information part 2 (SCI-2) decoding failure at the first sidelink UE, or
the method further comprises at least one of:
transmitting traffic information based at least in part on a traffic information request, associated with a total quantity of packets transmitted in a time window, or a defined periodicity,
performing a beam search to mitigate the FR2 radio link or beam failure in a beam training opportunity corresponding to a semi-static network wide resource for beam training, or
negotiating, with the second sidelink UE and over the FR1 RRC connection, one or more parameters associated with monitoring the FR2 radio link.

17. The method of claim 16, wherein transmitting the indication comprises transmitting an RRC reconfiguration message that indicates the FR2 radio link or beam failure based at least in part on the FR1 RRC connection between the first sidelink UE and the second sidelink UE.

18. The method of claim 16, further comprising:
transmitting, to the second sidelink UE, a message to establish the FR1 RRC connection between the first sidelink UE and the second sidelink UE, wherein the message indicates that the FR1 RRC connection is for monitoring the FR2 radio link between the first sidelink UE and the second sidelink UE.

19. The method of claim 16, further comprising:
receiving, from the second sidelink UE via the FR1 RRC connection, the traffic information request; and
transmitting, to the second sidelink UE via the FR1 RRC connection, the traffic information based at least in part on the traffic information request.

20. The method of claim 16, further comprising:
transmitting, to the second sidelink UE via the FR1 RRC connection, the traffic information based at least in part on the defined periodicity, wherein the traffic information indicates a total number of transmissions over a period of time.

21. The method of claim 20, wherein the defined periodicity is configured as a default parameter for a plurality of traffic types.

22. The method of claim 20, wherein the defined periodicity is based at least in part on quality of service parameters associated with different traffic classes.

23. The method of claim 20, wherein the defined periodicity is negotiated per link or per session between the first sidelink UE and the second sidelink UE.

24. The method of claim 16, wherein detecting the FR2 radio link or beam failure comprises detecting the FR2 radio link or beam failure based at least in part on a block error rate associated with a packet count or the traffic information.

25. The method of claim 16, wherein detecting the FR2 radio link or beam failure comprises detecting the FR2 radio link or beam failure based at least in part on the SCI-2 decoding failure.

26. The method of claim 25, further comprising:
transmitting, to the second sidelink UE via the FR1 RRC connection, an indication to modify a modulation and coding scheme (MCS) associated with a SCI-2, wherein the MCS is based at least in part on a beta offset; or
transmitting, to the second sidelink UE, an indication of a suggested MCS to be associated with the SCI-2.

27. The method of claim 26, further comprising:
receiving, from the second sidelink UE via the FR1 RRC connection, a response indicating that the MCS has been modified based at least in part on the indication received from the first sidelink UE; or
receiving, from the second sidelink UE, a response indicating that the MCS has not been modified.

28. The method of claim 16, further comprising:
performing the beam search.

29. The method of claim 16, further comprising:
negotiating, with the second sidelink UE and over the FR1 RRC connection, the one or more parameters associated with monitoring the FR2 radio link, wherein the one or more parameters correspond to one or more of: resources associated with beam search, beam training sequences associated with the beam search, or random access channel (RACH) sequences or beam training response preamble sequences associated with RACH transmissions or beam training responses occurring during beam training.

30. The method of claim 16, wherein the first sidelink UE and the second sidelink UE are sidelink UEs with a non-standalone FR2 capability, and wherein FR1 corresponds to a sub-6 gigahertz band and FR2 corresponds to a millimeter wave band.

* * * * *